US012601939B2

(12) United States Patent (10) Patent No.: US 12,601,939 B2

DeMiglio et al. (45) **Date of Patent: \*Apr. 14, 2026**

(54) FILM-TO-GLASS SWITCHABLE GLAZING

(71) Applicant: Cardinal IG Company, Eden Prairie, MN (US)

(72) Inventors: Andrew DeMiglio, Savage, MN (US); Eric Bjergaard, Minneapolis, MN (US); Hari Atkuri, Plymouth, MN (US); Nicholas Schleder, Saint Paul, MN (US)

(73) Assignee: Cardinal IG Company, Eden Prairie, MN (US)

( * ) Notice: Subject to any disclaimer, the term of this patent is extended or adjusted under 35 U.S.C. 154(b) by 85 days.

This patent is subject to a terminal disclaimer.

(21) Appl. No.: 18/457,327

(22) Filed: Aug. 28, 2023

(65) Prior Publication Data

US 2023/0400724 A1 Dec. 14, 2023

Related U.S. Application Data

(63) Continuation of application No. 17/746,028, filed on May 17, 2022, now Pat. No. 11,740,497, which is a (Continued)

(51) Int. Cl.
B32B 17/10 (2006.01)
C03C 17/00 (2006.01)
(Continued)

(52) U.S. Cl.
CPC .. G02F 1/133305 (2013.01); B32B 17/10513 (2013.01); B32B 17/10779 (2013.01);
(Continued)

(58) Field of Classification Search
None
See application file for complete search history.

(56) References Cited

U.S. PATENT DOCUMENTS

| 4,268,126 A | 5/1981 | Mumford |
| 4,456,335 A | 6/1984 | Mumford |
| | (Continued) | |

FOREIGN PATENT DOCUMENTS

| CN | 1555310 A | 12/2004 |
| JP | S58143087 A | 8/1983 |
| | (Continued) | |

OTHER PUBLICATIONS

Corning Museum of Glass: Types of Glass, available at https://www.cmog.org/article/types-glass (Dec. 8, 2011) (Year: 2011).

(Continued)

*Primary Examiner* — Kim S. Horger
(74) *Attorney, Agent, or Firm* — Fredrikson & Byron, P.A.

(57) ABSTRACT

A privacy glazing structure may include an electrically controllable optically active material, such as a liquid crystal material, sandwiched between a flexible substrate and a rigid substrate. The flexible substrate and the rigid substrate may each have a conductive layer deposited on the surface facing the optically active material. The flexible substrate may be bonded about its perimeter to the rigid substrate and may be sufficiently flexible to conform to non-planarity of the rigid substrate. As a result, the flexible substrate may adopt the surface contour of the rigid substrate to maintain a uniform thickness of optically active material between the flexible substrate and the rigid substrate.

19 Claims, 4 Drawing Sheets

Related U.S. Application Data continuation of application No. 16/872,066, filed on May 11, 2020, now Pat. No. 11,333,912, which is a continuation of application No. 15/892,251, filed on Feb. 8, 2018, now Pat. No. 10,649,252.

(60) Provisional application No. 62/456,286, filed on Feb. 8, 2017.

(51) Int. Cl.

| | |
|---|---|
| *C03C 17/23* | (2006.01) |
| *E06B 3/67* | (2006.01) |
| *E06B 9/24* | (2006.01) |
| *G02F 1/1333* | (2006.01) |
| *G02F 1/1339* | (2006.01) |
| *G02F 1/137* | (2006.01) |
| *G02F 1/153* | (2006.01) |
| *G02F 1/161* | (2006.01) |
| *G02F 1/17* | (2019.01) |
| *E06B 3/66* | (2006.01) |
| *E06B 3/663* | (2006.01) |

(52) U.S. Cl.

CPC ............ *C03C 17/002* (2013.01); *C03C 17/23* (2013.01); *E06B 3/6722* (2013.01); *E06B 9/24* (2013.01); *G02F 1/13392* (2013.01); *G02F 1/13394* (2013.01); *G02F 1/13725* (2013.01); *G02F 1/1533* (2013.01); *G02F 1/161* (2013.01); *G02F 1/172* (2013.01); *C03C 2217/24* (2013.01); *E06B 3/6612* (2013.01); *E06B 3/66314* (2013.01); *E06B 3/66352* (2013.01); *E06B 2003/66385* (2013.01); *E06B 2009/2464* (2013.01); *G02F 1/133302* (2021.01); *G02F 1/13756* (2021.01); *G02F 2202/022* (2013.01); *G02F 2202/04* (2013.01); *G02F 2202/09* (2013.01); *G02F 2203/01* (2013.01)

(56) References Cited

U.S. PATENT DOCUMENTS

| | | | |
|---|---|---|---|
| 4,848,875 | A | 7/1989 | Baughman et al. |
| 4,963,206 | A | 10/1990 | Shacklette et al. |
| 5,025,602 | A | 6/1991 | Baughman et al. |
| 5,111,329 | A | 5/1992 | Gajewski et al. |
| 5,111,629 | A | 5/1992 | Baughman et al. |
| 5,408,353 | A | 4/1995 | Nichols et al. |
| 7,347,608 | B2 | 3/2008 | Emde |
| 8,199,264 | B2 | 6/2012 | Veerasamy |
| 8,665,384 | B2 | 3/2014 | Veerasamy |
| 9,274,631 | B2 | 3/2016 | Anno et al. |
| 9,904,136 | B2 | 2/2018 | Burrows et al. |
| 10,649,252 | B2 | 5/2020 | DeMiglio |
| 2004/0036833 | A1 | 2/2004 | Monzen |
| 2005/0105303 | A1 | 5/2005 | Emde |
| 2007/0020442 | A1 | 1/2007 | Giron et al. |
| 2010/0157180 | A1 | 6/2010 | Doane et al. |
| 2011/0216389 | A1 | 9/2011 | Piroux et al. |
| 2013/0278989 | A1* | 10/2013 | Lam ...................... G02F 1/157 359/275 |
| 2015/0138628 | A1* | 5/2015 | Guiset ............... B32B 17/10174 359/318 |
| 2015/0277165 | A1 | 10/2015 | Burrows et al. |
| 2015/0331296 | A1* | 11/2015 | Mennig ............. B32B 17/10174 156/99 |
| 2016/0259224 | A1 | 9/2016 | Özyilmaz et al. |

FOREIGN PATENT DOCUMENTS

| | | |
|---|---|---|
| JP | 2013503362 A | 1/2013 |
| JP | 2016212222 A | 12/2016 |
| WO | 2015148675 A1 | 10/2015 |

OTHER PUBLICATIONS

International Patent Application No. PCT/US2018/017471, International Search Report and Written Opinion mailed May 2, 2018, 13 pages.
"Ortliche Verwerfungen" Baunetz Wissen, retrieved online from <https://www.baunetzwissen.de/glossar/a/oertliche-verwerfungen-2482601>, known to be publicly available on Apr. 17, 2018, 4 pages (including 2 pages English Machine Translation).

* cited by examiner

16

18

40

42

24

FILM-TO-GLASS SWITCHABLE GLAZING

RELATED APPLICATIONS

This application is a continuation of U.S. patent application Ser. No. 17/746,028, filed May 17, 2022, which is a continuation of U.S. patent application Ser. No. 16/872,066, filed May 11, 2020, which is a continuation of U.S. patent application Ser. No. 15/892,251, filed Feb. 8, 2018, which claims the benefit of U.S. Provisional Patent Application No. 62/456,286, filed Feb. 8, 2017. The entire contents of each of these applications are incorporated herein by reference.

TECHNICAL FIELD

This disclosure relates to optical structures and, more particularly, to glazing structures that include a controllable optically active material.

BACKGROUND

Windows, doors, partitions, and other structures having controllable light modulation have been gaining popularity in the marketplace. These structures are commonly referred to as "smart" structures or "privacy" structures for their ability to transform from a transparent state in which a user can see through the structure to a private state in which viewing is inhibited through the structure. For example, smart windows are being used in high-end automobiles and homes and smart partitions are being used as walls in office spaces to provide controlled privacy and visual darkening.

A variety of different technologies can be used to provide controlled optical transmission for a smart structure. For example, electrochromic technologies, photochromic technologies, thermochromic technologies, suspended particle technologies, and liquid crystal technologies are all being used in different smart structure applications to provide controllable privacy. The technologies generally use an energy source, such as electricity, to transform from a transparent state to a privacy state or vice versa.

While privacy technology is gaining popularity, there are still practical challenges to successful implementation of the technology. For example, if the material used to impart controllable privacy is not uniformly applied across the privacy structure, pockets or regions may form that are comparatively darker or comparatively lighter than the remainder of the structure when transitioned into the privacy state. This can create an undesirable visual appearance and inconsistent privacy shielding across the structure. As another example, if the hardware components needed to transform a standard window or door structure into a privacy glazing structure are too heavy, a manufacturer of window and door products may not be able to readily utilize such privacy glazing structures on existing product lines. Rather, special product designs may be required to accommodate the size and weight of the privacy structure, which may be more difficult to implement and find less market acceptance than more standard designs.

SUMMARY

In general, this disclosure is directed to privacy cells and privacy glazing structures incorporating optically active material that provides controllable privacy. In some examples, a privacy glazing structure includes multiple rigid substrates and a spacer that holds the rigid substrates in parallel alignment and defines a between pane space. The privacy glazing structure can further include a flexible substrate that is bonded about its perimeter to a surface of one of the rigid substrates facing the between pane space. A cavity may be defined between the flexible substrate and the surface of the rigid substrate to which the flexible substrate is bonded. An electrically controllable optically active material may be positioned inside of the cavity to provide controllable privacy for the glazing structure. The flexible substrate may be sufficiently flexible to conform to any non-planarity of the rigid substrate to which the flexible substrate is bonded. Accordingly, the flexible substrate may conform to surface variations of the rigid substrate.

Without wishing to be bound by any particular theory, it has been observed that certain rigid substrates used to form a privacy glazing structure, such as glass sheets, may not be perfectly planar across their face. Rather, such rigid substrates may exhibit regions that are higher or lower than adjacent regions across the face of the substrate, such as peaks and valleys that form a waviness across the face of the substrate. For example, when using thermally strengthened glass, the thermally strengthened glass may exhibit non-planer distortions imparted during the strengthening process that can be caused from non-uniform heat transfer and/or unbalanced support of the glass structure. These deformations may be characterized by a resulting defect appearance and may be described as roller wave or edge kink non-planarity defects. When forming a privacy glazing structure using two glass substrates that both exhibit deformations, such as roller wave and/or edge kink deformations, the thickness of the space between the two glass substrates holding the optically active material may not be uniform across the face of the structure. The peaks and valleys of the opposed glass sheets may not be aligned to provide a generally uniform thickness of optically active material but may instead be misaligned, creating regions where a peak of one sheet faces a peak of the opposite sheet, regions where a valley of one sheet faces a valley of the opposite sheet, and yet further regions where a peak of one sheet faces the valley of the opposite sheet.

When a privacy glazing structure has inconsistent spacing between the surfaces of the substrates holding the optically active material, the optically active material may be thicker in some regions and thinner in other regions. Indeed, in some situations, the inconsistent spacing may cause voids or pockets to form between the sheets that are devoid of optically active material. In either case, when the optically active material is transitioned to a darkened or privacy state, the inconsistencies in the thickness of the optically active material may cause some regions of the glazing structure to appear darker than other regions. For example, the privacy glazing structure may appear darker in areas where the optically active material is thicker than adjacent areas where the optically active material is thinner or, in more significant circumstances, entirely missing. This can cause inconsistencies in the visual appearance of the privacy glazing structure, such as the level of privacy provided across the structure.

By configuring a privacy glazing structure with the flexible substrate bonded to a comparatively rigid substrate to form the cavity holding the optically active material, the flexible substrate may adapt to conform to variations in the surface thickness of the opposed rigid substrate. For example, the flexible substrate may substantially mirror the surface variations of the rigid substrate, such that the flexible substrate defines a peak where there is a valley in the opposed rigid substrate and the flexible substrate defines a valley where there is a peak in the opposed rigid substrate. As a result, the thickness of the cavity holding the optically active material may be substantially uniform across the entirety of the privacy glazing structure even though the rigid substrate has surface variations that would otherwise cause thickness variations in the cavity. This can provide a more uniform visual appearance and more uniform privacy across the glazing structure than if the glazing structure is formed of two rigid substrates that both exhibit surface waviness and non-planarity.

In one example, a privacy glazing structure includes a tempered glass substrate and a flexible polymeric sheet bonded to the tempered glass substrate about its perimeter to define a cavity containing a liquid crystal material. The tempered glass substrate may exhibit surface waviness caused by thermal treatment during the tempering process. However, the tempered glass substrate may be beneficial to impart additional strength and safety characteristics to the privacy glazing structure that would not otherwise be achieved if using a standard, non-strengthened glass substrate. The flexible polymeric sheet may be sufficiently flexible to conform to the waviness of the tempered glass substrate such that the cavity retaining liquid crystal material is substantially uniform in thickness across the face of the privacy glazing structure. The tempered glass substrate may, in turn, be bonded about its perimeter to another glass substrate with a spacer to define a between-pane space between the two glass substrates, which may be filled with an insulative gas. The flexible polymeric sheet may be positioned inside of the between pane space. As a result, the flexible polymeric sheet may be protected from scratches and puncturing by the glass sheet to which the flexible polymeric sheet is bonded.

Configuring a privacy glazing structure with a comparatively flexible substrate bonded to a comparatively rigid substrate with an optically active material retained between the two substrates can be useful for other reasons in addition to or in lieu of providing a substantially uniform optically active layer. As one example, a privacy glazing structure may be made thinner and may weigh less than a comparative privacy glazing structure in which all the substrates are formed of a more rigid material, such as glass. This can be useful for incorporating the privacy glazing structure into existing product designs that have size and/or weight restrictions corresponding to the size and/or weight of a standard insulating glass unit that does not have controllable privacy capabilities. As another example, the flexible substrate may be used to impart UV blocking capabilities for the optically active material in addition to forming a wall surface bounding the optically active material. In the case of a liquid crystal optically active material, for example, the liquid crystal material may have a tendency to degrade over time with exposure to UV light from the sun. To help protect the liquid crystal material from such UV light, the flexible substrate can carry UV blocking agents and can be positioned on an outboard side of the privacy glazing structure. Once installed, sunlight entering the privacy glazing structure may pass through the flexible substrate before impinging upon the liquid crystal material and passing therethrough. Accordingly, the UV blocking properties of the flexible substrate can help filter UV light from the sunshine before it reaches the liquid crystal material, helping to prevent degradation of the liquid crystal material during the service life of the privacy glazing structure.

In one example, a privacy glazing structure is described that includes a first rigid substrate of transparent material and a second rigid substrate of transparent material that is generally parallel to the first rigid substrate. The second rigid substrate has a first surface and a second surface opposite the first surface. The structure further includes a spacer positioned between the first rigid substrate and the second rigid substrate to define a between-pane space and a flexible substrate having a first surface and a second surface opposite the first surface. The example structure also includes a first substantially transparent conductive layer carried on the first surface of the flexible substrate, a second substantially transparent conductive layer carried on the first surface of the second rigid substrate facing the between-pane space, and an electrically controllable optically active material. The example specifies that the flexible substrate is bonded about its perimeter to the first surface of the second rigid substrate to form a cavity therebetween, the electrically controllable optically active material is disposed within the cavity, and the flexible substrate is sufficiently flexible to conform to non-planarity of the second rigid substrate.

The details of one or more examples are set forth in the accompanying drawings and the description below. Other features, objects, and advantages will be apparent from the description and drawings, and from the claims.

DETAILED DESCRIPTION

Figure 1:
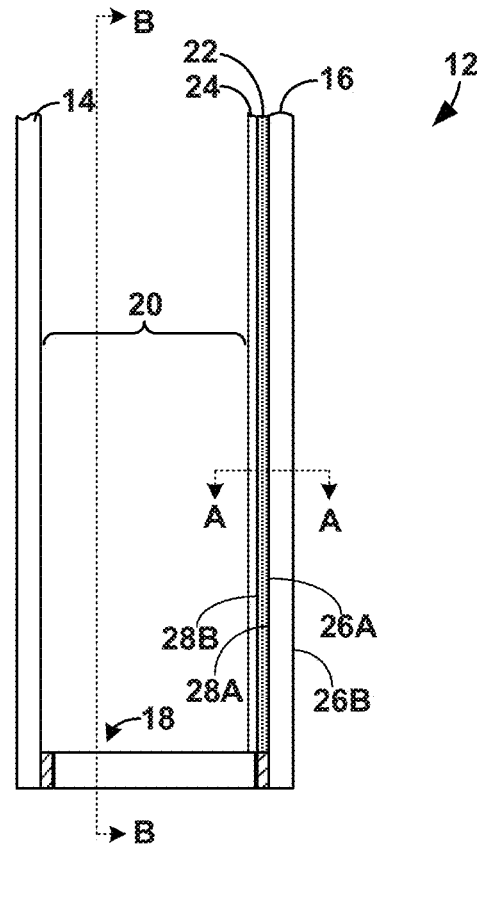
FIG. 1 is a side view of an example privacy glazing structure according to the disclosure.

In general, this disclosure relates to privacy structures that contain a controllable optically active material positioned between a comparatively rigid substrate and a comparatively flexible substrate. The term privacy structure includes privacy cells, privacy glazing structures, smart cells, smart glazing structure, and related devices that provide controllable optical activity and, hence, visibility through the structure. Such structures can provide switchable optical activity that provides controllable darkening, controllable light scattering, or both controllable darkening and controllable light scattering. Controllable darkening refers to the ability of the optically active material to transition between a high visible light transmission state (a bright state), a low visible light transmission dark state, and optionally intermediate states therebetween, and vice versa, by controlling an external energy source applied to the optically active material. Controllable light scattering refers to the ability of the optically active material to transition between a low visible haze state, a high visible haze state, and optionally intermediate states therebetween, and vice versa, by controlling an external energy source. Thus, reference to the terms "privacy" and "privacy state" in the present disclosure does not necessarily require complete visible obscuring through the structure (unless otherwise noted). Rather, different degrees of privacy or obscuring through the structure may be achieved depending, e.g., on the type of optically active material used and the conditions of the external energy source applied to the optically active material.

In some examples, a privacy structure is in the form of a multiple-pane insulating glazing unit having first and second panes of transparent material along with a spacer separating the transparent panes of material to provide a between-pane space. The multiple-pane insulating glazing unit carries a layer of electrically controllable optically active material positioned behind one of the panes of transparent material within the between-pane space. The electronically controllable optically active material can be controllably alternated between a light transmissive state and a privacy state, such as a light scattering and/or light absorbing state. When placed in the privacy state, light impinging upon the optically active material can scatter and/or absorb rather than pass through the material, obscuring visibility through the material to an external observer. The electronically controllable optically active material may be retained in the between-pane space by sandwiching the material against the interior surface of one of the panes of transparent material with a flexible substrate. The flexible substrate can flex and bend to conform to variations in the surface waviness of the opposite pane of transparent material against which the optically active material is sandwiched.

Although the configuration and positioning of the flexible substrate can vary, in some examples, the flexible substrate is selected to be compatible with and/or provide synergistic properties for the other components of the privacy glazing structure. For instance, in some examples, the flexible substrate is selected to have a coefficient of thermal expansion substantially consistent with the coefficient of thermal expansion of the opposed substrate to which the flexible substrate is bonded. This may help prevent the flexible substrate from pulling away or otherwise detaching from the substrate to which it is bonded during thermal cycling. As another example, the flexible substrate may be selected to provide UV blocking capabilities, thereby helping to filter light within the ultraviolet wavelengths before impinging upon the optically active material positioned behind the flexible substrate. This can help prevent degradation and premature deterioration of the optically active material over the service life of the privacy glazing structure. A privacy glazing structure can have a variety of different components and configurations, as described in greater detail herein.

FIG. 1 is a side view of an example privacy glazing structure 12 that includes a first substrate of transparent material 14 spaced apart from the second substrate of transparent material 16 by a spacer 18 to define a between-pane space 20. Spacer 18 may extend around the entire perimeter of privacy glazing structure 12 to hermetically seal the between-pane space 20 from gas exchange with a surrounding environment. In the illustrated example, privacy glazing structure also includes a layer of optically active material 22 positioned on a side of second substrate 16 facing the between-pane space 20. In addition, the structure includes a layer formed of comparatively flexible material 24 sandwiching the layer of optically active material 22 against the second substrate 16. The layer of optically active material 22 can transition from a generally transparent state to a privacy state to control visibility through privacy glazing structure 12. In the privacy state, the layer of optically active material 22 may be dark and/or hazy, obscuring viewing through the material.

Privacy glazing structure 12 can utilize any suitable privacy materials for the layer of optically active material 22. Further, although optically active material 22 is generally illustrated and described as being a single layer of material, it should be appreciated that a structure in accordance with the disclosure can have one or more layers of optically active material with the same or varying thicknesses. In general, optically active material 22 is configured to provide controllable and reversible optical obscuring and lightening. Optically active material 22 can change visible transmittance in response to an energy input, such as light, heat, or electricity. For example, optically active material 22 may be an electronically controllable optically active material that changes direct visible transmittance in response to changes in electrical energy applied to the material.

In one example, optically active material 22 is formed of an electrochromic material that changes opacity and, hence, light transmission properties, in response to voltage changes applied to the material. Typical examples of electrochromic materials are $WO_3$ and $MoO_3$, which are usually colorless when applied to a substrate in thin layers. An electrochromic layer may change its optical properties by oxidation or reduction processes. For example, in the case of tungsten oxide, protons can move in the electrochromic layer in response to changing voltage, reducing the tungsten oxide to blue tungsten bronze. The intensity of coloration is varied by the magnitude of charge applied to the layer.

In another example, optically active material 22 is formed of a liquid crystal material. Different types of liquid crystal materials that can be used as optically active material 22 include polymer dispersed liquid crystal (PDLC) materials and polymer stabilized cholesteric texture (PSCT) materials. Polymer dispersed liquid crystals usually involve phase separation of nematic liquid crystal from a homogeneous liquid crystal containing an amount of polymer, sandwiched between electrodes. The electrodes can be formed by coating opposed substrates (e.g., second substrate 16 and flexible substrate 24) with a transparent conductive material. When the electric field is off, the liquid crystals are randomly scattered. This scatters light entering the liquid crystal and diffuses the transmitted light through the material. When a certain voltage is applied between the two electrodes, the liquid crystals homeotropically align and the liquid crystals increase in optical transparency, allowing light to transmit through the crystals.

In the case of polymer stabilized cholesteric texture (PSCT) materials, the material can either be a normal mode polymer stabilized cholesteric texture material or a reverse mode polymer stabilized cholesteric texture material. In a normal polymer stabilized cholesteric texture material, light is scattered when there is no electrical field applied to the material. If an electric field is applied to the liquid crystal, it turns to the homeotropic state, causing the liquid crystals to reorient themselves parallel in the direction of the electric field. This causes the liquid crystals to increase in optical transparency and allows light to transmit through the liquid crystal layer. In a reverse mode polymer stabilized cholesteric texture material, the liquid crystals are transparent in the absence of an electric field (e.g., zero electric field) but light scattering upon application of an electric field.

In one example in which the layer of optically active material 22 is implemented using liquid crystals, the optically active material includes liquid crystals and a dichroic dye to provide a guest-host liquid crystal mode of operation. When so configured, the dichroic dye can function as a guest compound within the liquid crystal host. The dichroic dye can be selected so the orientation of the dye molecules follows the orientation of the liquid crystal molecules. In some examples, when an electric field is applied to the optically active material, there is little to no absorption in the short axis of the dye molecule, and when the electric field is removed from the optically active material, the dye molecules absorb in the long axis. As a result, the dichroic dye molecules can absorb light when the optically active material is transitioned to a scattering state. When so configured, the optically active material may absorb light impinging upon the material to prevent an observer on one side of privacy glazing structure 12 from clearly observing activity occurring on the opposite side of the structure.

When optically active material 22 is implemented using liquid crystals, the optically active material may include liquid crystal molecules within a polymer matrix. The polymer matrix may or may not be cured, resulting in a solid or liquid medium of polymer surrounding liquid crystal molecules. In addition, in some examples, the optically active material 22 may contain spacer beads, for example having an average diameter ranging from 3 micrometers to 40 micrometers, to maintain separation between second substrate 16 and flexible substrate 24 (e.g., such as spacer beads 23 illustrated in FIG. 2).

In another example in which the layer of optically active material 22 is implemented using a liquid crystal material, the liquid crystal material turns hazy when transitioned to the privacy state. Such a material may scatter light impinging upon the material to prevent an observer on one side of privacy glazing structure 12 from clearly observing activity occurring on the opposite side of the structure. Such a material may significantly reduce regular visible transmittance through the material (which may also be referred to as direct visible transmittance) while only minimally reducing total visible transmittance when in the privacy state, as compared to when in the light transmitting state. When using these materials, the amount of scattered visible light transmitting through the material may increase in the privacy state as compared to the light transmitting state, compensating for the reduced regular visible transmittance through the material. Regular or direct visible transmittance may be considered the transmitted visible light that is not scattered or redirected through optically active material 22.

Another type of material that can be used as the layer of optically active material 22 is a suspended particle material. Suspended particle materials are typically dark or opaque in a non-activated state but become transparent when a voltage is applied. Yet other examples of materials that can be used as optically active material 22 include thermochromic materials that change visible transmittance in response to changing temperature and photochromic materials that change visible transmittance in response to changing amounts of light.

Independent of the specific type of material(s) used for the layer of optically active material 22, the material can change from a light transmissive state in which privacy glazing structure 12 is intended to be transparent to a privacy state in which visibility through the insulating glazing unit is intended to be reduced. Optically active material 22 may exhibit progressively decreasing direct visible transmittance when transitioning from a maximum light transmissive state to a maximum privacy state. Similarly, optically active material 22 may exhibit progressively increasing direct visible transmittance when transitioning from a maximum privacy state to a maximum transmissive state. The speed at which optically active material 22 transitions from a generally transparent transmission state to a generally opaque privacy state may be dictated by a variety factors, including the specific type of material selected for optically active material 22, the temperature of the material, the electrical voltage applied to the material, and the like.

Depending on the type of material used for optically active material 22, the material may exhibit controllable darkening. As noted above, controllable darkening refers to the ability of the optically active material to transition between a high visible light transmission state (a bright state), a low visible light transmission dark state, and optionally intermediate states therebetween, and vice versa, by controlling an external energy source applied to the optically active material. When optically active material 22 is so configured, the visible transmittance through the cell formed by flexible material 24, optically active material 22, and second substrate 16 may be greater than 40% when optically active material 22 is transitioned to the high visible transmission state light state, such as greater than 60%. By contrast, the visible transmittance through the cell may be less than 5 percent when optically active material 22 is transitioned to the low visible light transmission dark state, such as less than 1%. Visible transmittance can be measured according to ASTM D1003-13.

Additionally or alternatively, optically active material 22 may exhibit controllable light scattering. As noted above, controllable light scattering refers to the ability of the optically active material to transition between a low visible haze state, a high visible haze state, and optionally intermediate states therebetween, and vice versa, by controlling an external energy source. When optically active material 22 is so configured, the transmission haze through the cell formed by flexible material 24, optically active material 22, and second substrate 16 may be less than 10% when optically active material 22 is transitioned to the low visible haze state, such as less than 2%. By contrast, the transmission haze through the cell may be greater than 85% when optically active material 22 is transitioned to the high visible haze state and have a clarity value below 50%, such as a transmission haze greater than 95% and a clarity value below 30%. Transmission haze can be measured according to ASTM D1003-13. Clarity can be measured using a BYK Gardener Haze-Gard meter, commercially available from BYK-GARDNER GMBH.

In the example of FIG. 1, optically active material 22 is positioned between second substrate 16 and flexible substrate 24. Flexible substrate 24 can be bonded about its perimeter to second substrate 16 (FIGS. 3 and 4) to form a cavity in which optically active material 22 is positioned. For example, second substrate 16 may define a first surface 26A and the second surface 26B opposite the first surface. The first surface 26A of the second substrate may face between-pane space 20, such that the first surface is positioned closer to the between pane space than the second surface. The flexible substrate 24 may also define a first surface 28A and a second surface 28B opposite the first surface. The second surface 28B of the flexible substrate may be exposed to the open atmosphere of the between-pane space 20, such that the first surface 28A is positioned closer to second substrate 16 than the second surface 28B. Optically active material 22 can be positioned between the first surface 26A of the second substrate 16 and the first surface 28A of the flexible substrate. In some examples, optically active material 22 is positioned in contact with the first surface 26A of the second substrate 16 and the first surface 28A, such that the two surfaces form respective walls of the cavity containing the optically active material.

First substrate 14 and second substrate 16 may be fabricated from a variety of different materials and, in different examples, may each be fabricated from the same material or may be fabricated from different materials. In general, at least second substrate 16 is fabricated from material that has more structural rigidity than the material used to fabricate flexible substrate 24. In some examples, first substrate 14 and/or second substrate 16 may be constructed of clear plastic or clear glass. For example, first substrate 14 and/or second substrate 16 may be formed of plastic such as, e.g., a fluorocarbon plastic, polypropylene, polyethylene, polyester, or polycarbonate. In other examples, first substrate 14 and/or second substrate 16 may be formed from multiple different types of materials. For example, the substrates may be formed of a laminated glass, which may include two panes of glass bonded together with polyvinyl butyral. In yet other examples, the first pane and/or second pane may be constructed of materials that are not transparent such as translucent materials or even opaque materials, which may or may not block light transmission through the panes.

In one example, first substrate 14 and/or second substrate 16 may be constructed of glass. In various examples, the glass may be aluminum borosilicate glass, sodium-lime (e.g., sodium-lime-silicate) glass, or another type of glass. In addition, the glass may be clear or the glass may be colored, depending on the application. Although the glass can be manufactured using different techniques, in some examples the glass is manufactured on a float bath line in which molten glass is deposited on a bath of molten tin to shape and solidify the glass. Such an example glass may be referred to as float glass.

When first substrate 14 and/or second substrate are manufactured of glass, the glass may or may not be thermally strengthened. Thermally-strengthened glass is generally stronger and more shatter resistant than glass that is not thermally-strengthened. Accordingly, incorporating one or more thermally strengthened glass panes in privacy glazing structure 12 can provide additional strength and shatter resistance, e.g., as compared to when the privacy glazing unit is constructed without using thermally strengthened glass. For example, utilizing thermally strengthened glass for second substrate 16 may provide additional strength to breakage of the exposed substrate protecting optically active material 22.

An example of a thermally-strengthened glass is tempered glass. Tempered glass is generally fabricated by heating the glass until the glass reaches a stress-relief point temperature (which may be referred to as the annealing temperature) and thereafter rapidly cooling the glass to induce compressive stresses in the surface of the glass. Tempered glass may exhibit a surface compression of greater than 10,000 pounds per square inch (psi), as determined in accordance with ASTM C1048-04. Another example of a thermally-strengthened glass is Heat Strengthened glass, which may exhibit a strength between tempered glass and annealed glass. Annealed glass is generally fabricated by heating the glass until the glass reaches a stress-relief point temperature (which may also be referred to as the annealing temperature) and thereafter slowly cooling the glass to relieve internal stresses. In some examples, Heat Strengthened glass exhibits a surface compression of approximately 5,000 psi, as determined in accordance with ASTM C1048-04.

Independent of the specific type of material used to first substrate 14 and/or second substrate 16, the surfaces of the substrates may not be perfectly planar. Rather, in practice, there may be depth variations across the surfaces of the substrates that cause surface waviness or other surface non-planarity. For example, with respect to second substrate 16, the first surface 26A may not reside entirely within a single plane (e.g., Z-Y plane indicated on FIG. 1) but may instead contain regions that project toward between-pane space 20 (e.g., in the negative X-direction indicated on FIG. 1) relative to other regions and/or regions that are recessed away from between-pane space 20 (e.g., in the positive X-direction indicated on FIG. 1) relative to other regions. As a result, the first surface 26A of second substrate 16 may not reside in a single plane but may instead have continuous (e.g., repeating) or discontinuous regions that are out of plane with respect to a midline of the first surface.

Figure 2:
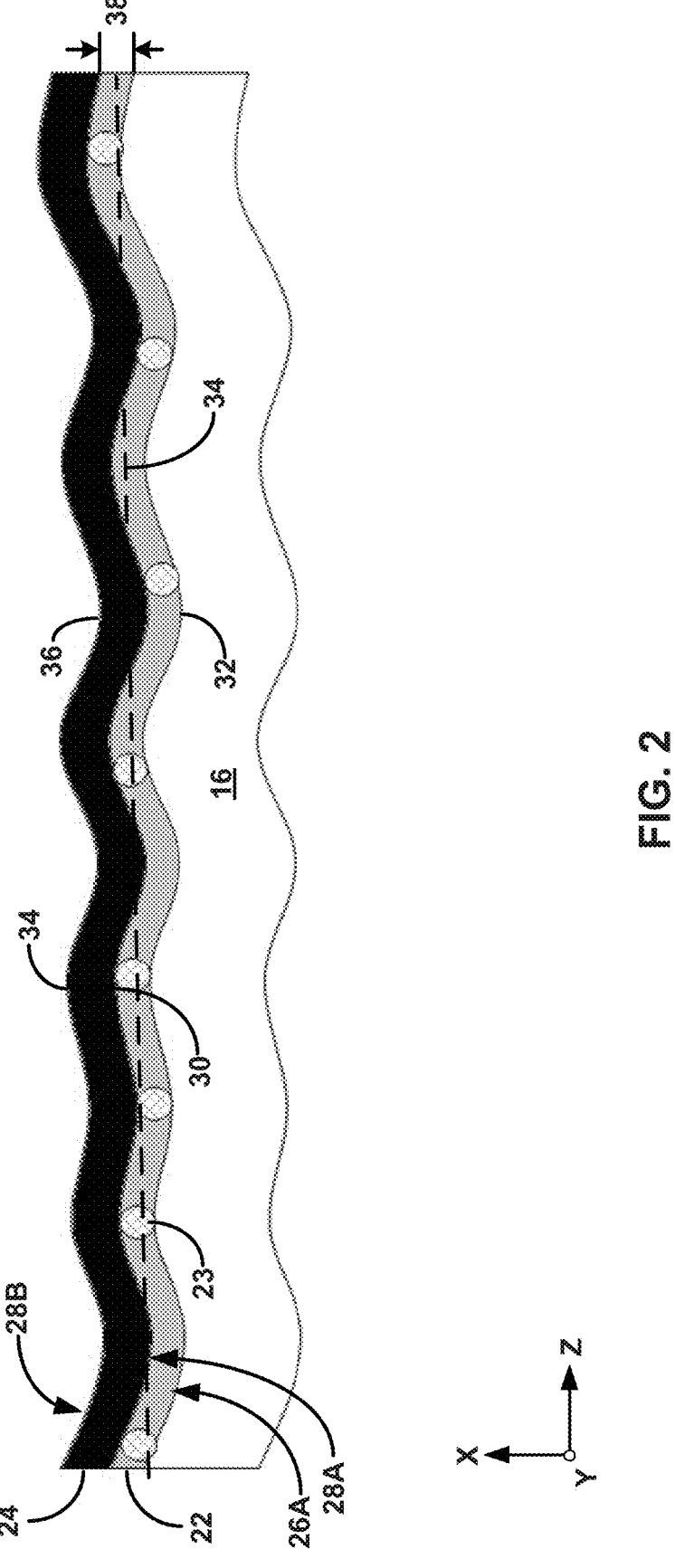
FIG. 2 is a sectional illustration of the example privacy glazing structure of FIG. 1 taken along the A-A sectional line illustrated on FIG. 1.

FIG. 2 is a sectional illustration of privacy glazing structure 12 taken along the A-A sectional line illustrated on FIG. 1 showing an example surface non-planarity that second substrate 16 may exhibit. As shown in this example, first surface 26A of second substrate 16 does not reside entirely within a single plane (e.g., Z-Y plane indicated on FIG. 1) but instead projects into between-pane space 20 and/or is recessed away from between-pane space relative to other sections of the surface. In particular, in the illustrated example, first surface 26A is illustrated as having a waveform pattern that includes peaks 30 and valleys 32 relative to a midline 34 of the first surface 26A. Each peak 30 is separated from an adjacent peak by a valley. Such a waveform defect may occur during the fabrication of second substrate 16 as the substrate is heated and passed over transport rollers, e.g., causing regions between adjacent transport rollers to sag and create a waveform defect. Although FIG. 2 illustrates one example configuration of a non-planar surface that second substrate 16 may exhibit, it should be appreciated that the disclosure is not limited in this respect.

For example, second substrate 16 may exhibit an edge kink non-planarity in addition to or in lieu of a roller wave non-planarity. Edge kink may be characterized by an upward or downward bow or curl at the leading edge and/or trailing edge of the substrate. Edge kink may be caused by the leading and trailing edges of the substrate being unsupported as they leave one roll and travel to an adjacent roll during the tempering processing, e.g., as the unsupported weight causes the edge to bend down.

In some examples, second substrate 16 has a non-planar first surface 26A characterized by an optical roll wave distortion value. The optical roll wave distortion value can be measured according to ASTM-C-1651. In general, optical roll wave distortion is measured according to the formula:

$$D=(4\pi^2 W/L^2)/1000.$$

In the equation above, D is in millidiopters, W is the roll wave depth (or peak-to-valley depth), and L is the peak-to-peak or valley-to-valley wavelength of the roll wave. The distortion D may be measured in the middle of second substrate 16 as well as along the edges of the substrate. For example, the distortion of the second substrate 16 may be measured for the centermost 90% area of first surface 26A of second substrate 16 and/or the peripheral-most 90% area of first surface 26A of second substrate 16.

In some examples, second substrate 16 exhibits an optical roll wave distortion value of at least 10 millidiopters, such as at least 20 millidiopters, at least 50 millidiopters, or at least 75 millidiopters. For example, when measuring the centermost 90% area of first surface 26A of second substrate 16, the first surface may exhibit an optical roll wave distortion ranging from 10 millidiopters to 180 millidiopters, such as from 50 millidiopters to 150 millidiopters. When measuring the peripheral-most 90% area of first surface 26A of second substrate 16, the first surface may exhibit an optical roll wave distortion ranging from 25 millidiopters to 400 millidiopters, such as from 100 millidiopters to 350 millidiopters. It should be appreciated that the foregoing values are examples and a non-planar substrate according to the disclosure may exhibit different optical roll wave distortion values.

In general, second substrate 16 is a comparatively rigid substrate such that shape and/or structure of first surface 26A (e.g., shape and/or structure of the non-planar regions)

does not change during the service life of the substrate. In some examples, second substrate 16 has a thickness (e.g., in the X-direction indicated on FIG. 2) greater than 1.2 mm, such as a thickness ranging from 2.0 mm to 4.8 mm. In one example, second substrate 16 has a thickness of 2.2 mm. First substrate 14 (FIG. 1) may have the same thickness as second substrate 16 or may have a different thickness. In either case, the rigidity of second substrate 16 may be characterized by its Young's modulus, which measures the stiffness of the material. In some examples, second substrate 16 exhibits a Young's modulus ranging from 50 GPa to 100 GPa at room temperature, such as from 65 GPa to 85 GPa.

To accommodate the non-planarity of first surface 26A of second substrate 16, some examples of the present disclosure utilize flexible substrate 24 to sandwich optically active material 22 to the first surface of the second substrate. Flexible substrate 24 may be sufficiently flexible to conform to the non-planarity of first surface of the second substrate. For example, flexible substrate 24 may mirror or adopt the surface profile of first surface 26A, e.g., such that first surface 28A and/or second surface 28B of the flexible substrate mirror the shape profile of first surface 26A of second substrate 16. When so configured, flexible substrate 24 may have peaks 34 that overlay and are aligned with peaks 30 (e.g., in the X-direction indicated on FIG. 2) and valleys 36 that overlay and are aligned with valleys 32.

To configure flexible substrate 24 to be sufficiently flexible to conform to surface contours of first surface 26A of second substrate 16, the flexible substrate may be formed of a material and/or have a thickness effective to follow the contour of an underlying layer (e.g., second substrate 16 to which the flexible substrate is bonded. In different examples, flexible substrate 24 may be fabricated from glass or a polymeric material. When flexible substrate 24 is formed of glass, the glass may be an aluminosilicate glass or a borosilicate glass, such as Willow® glass sold by Corning®. When flexible substrate 24 is formed of a polymer, the substrate may be formed as a single layer of polymeric material or multiple layers of polymeric material joined together. In general, the polymeric material may be selected to be chemically compatible with optically active material 22 and provide suitable visible transmittance characteristics for the privacy glazing structure. As examples, flexible substrate 24 may be formed of PET (polyethylene terephthalate), PEN (polyethylene naphthalate), PE (polyethylene), PP (polypropylene), PC (polycarbonate), or TAC (cellulose triacetate).

In some examples, flexible substrate 24 is constructed of a material that provides a coefficient of thermal expansion consistent with the coefficient of thermal expansion of the material used to fabricate second substrate 16. If flexible substrate 24 is constructed of material that has too great of a thermal expansion mismatch with that of second substrate 16, the flexible substrate may have a tendency to detach from the second substrate during thermal cycling. This is because the inconsistent thermal expansion of the two substrates may create stresses and/or shear forces between the substrates, which may overcome the force of the adhesive holding the flexible substrate to the second substrate. By configuring flexible substrate 24 and second substrate 16 to have sufficiently matched coefficients of thermal expansion, the two substrates may expand and contract sufficiently equivalent amounts during thermal cycling to prevent detachment of the substrates from each other.

In some examples, flexible substrate 24 has a coefficient of thermal expansion that falls within a range from 20% of the coefficient of thermal expansion of the second substrate 16 to 120% of the coefficient of thermal expansion of the second substrate, such as from 20% of the coefficient of thermal expansion of the second substrate to 100% of the coefficient of thermal expansion of the second substrate. For example, flexible substrate 24 may have a coefficient of thermal expansion ranging from 5 ppm/° F. to 110 ppm/° F., such as from 7 ppm/° F. to 50 ppm/° F., or from 10 ppm/° F. to 45 ppm/° F. In these examples, second substrate 16 may have a coefficient of thermal expansion ranging from 5 ppm/° F. to 35 ppm/° F., such as from 7.5 ppm/° F. to 25 ppm/° F.

In applications where flexible substrate 24 is located inside of between-pane space 20 (FIG. 1), the flexible substrate may be shielded from adverse environmental conditions by first substrate 14, second substrate 16, and spacer 18. Accordingly, while flexible substrate 24 may provide environmental barrier properties to optically active material 22, the flexible substrate need not provide these performance characteristics in certain applications. Rather, in some such applications, flexible substrate 24 may be configured for flexibility rather than environmental barrier properties, which may cause a corresponding loss and flexibility. In some examples, flexible substrate has a water vapor transmission rate greater than 10 g/m²-24 hours, such as a water vapor transmission rate ranging from 10 g/m²-24 hours to 40 g/m²-24 hours.

Independent of the specific material(s) used to fabricate flexible substrate 24, the substrate may be thinner than second substrate 16. This can allow the flexible substrate to conform to the surface variations of second substrate 16. As examples, flexible substrate 24 may have a thickness (e.g., in the X-direction indicated on FIG. 2) less than 1 mm, such as less than 0.5 mm, or less than 0.25 mm. For example, flexible substrate 24 may have a thickness ranging from 0.0125 mm to 0.25 mm, such as from 0.025 mm to 0.05 mm.

The flexibility of flexible substrate 24 may be characterized by its Young's modulus. In general, the lower the Young's modulus value for flexible substrate 24, the more flexible the substrate. Depending on the type of material used to fabricate flexible substrate 24, the substrate may exhibit a Young's modulus less than 10 GPa, such as less than 5 GPa. For example, flexible substrate 24 may exhibit a Young's modulus ranging from 1.5 GPa to 5 GPa (e.g., when the substrate is fabricated from PET or a similar polymeric material). Accordingly, a flexible substrate 24 may exhibit a Young's modulus ranging from 1% to 10% of the Young's modulus of second substrate 16, such as from 1% to 7% of the Young's modulus of second substrate 16.

Flexible substrate 24 may also be characterized by its flexural rigidity. In general, flexural rigidity is a measure of stiffness and is the product of the modulus of elasticity and moment of inertia divided by the length of the member. When flexible substrate 24 has a comparatively high flexural rigidity, it may not be sufficiently flexible to conform and maintain adherence to second substrate 16. Accordingly, in some configurations, flexible substrate 24 has a flexural rigidity less than 10 Newton-millimeter, such as less than 5 N-mm. For example, flexible substrate 24 may have a flexural rigidity ranging from 0.001 N-mm to 3.0 N-mm (e.g., when flexible substrate 24 is PET). By contrast, second substrate 16 may have a flexural rigidity greater than 35 N-mm, such as greater than 45 N-mm.

To help protect optically active material 22 from ultraviolet light that may degrade the optically active material over time, flexible substrate 24 may be configured as a UV blocking substrate. In some examples, flexible substrate 24 is fabricated from a material containing UV blocking agents.

Example UV blocking agents include ultraviolet absorbers such as oxanilides, benzophenones, benzotriazoles, and hydroxyphenyltriazines, as well as hindered amine light stabilizers, such as hindered amine light stabilizers that contain a substituted 2,2,6,6-tetramethylpiperidine ring. Additionally or alternatively, flexible substrate 24 may be coated with a UV blocking coating (e.g., on second surface 28B) to inhibit ultraviolet radiation from passing through the flexible substrate and impinging upon optically active material 22. Configuring flexible substrate 24 with the UV blocking properties can be helpful both to protect the underlying optically active material 22 as well as to prevent degradation of flexible substrate 24 itself. For example, when flexible substrate is formed of a polymeric material, the polymeric material may have a tendency to turn a yellow tint or otherwise degrade if exposed to unblocked ultraviolet light during the course of its service life. Configuring flexible substrate 24 with UV blocking properties, for example either in the form of additives to the flexible substrate and/or in overlaying coating, can reduce or eliminate such degradation of the flexible substrate.

The amount of light blocked by flexible substrate 24 can be characterized by measuring transmittance through the substrate at a wavelength of 380 nm, which may be referred to as a T380 value. Flexible substrate 24 may exhibit a T380 less than 5%, such as less than 3%, or less than 2%.

As mentioned above, flexible substrate 24 may be sufficiently flexible to conform to the surface profile and contours of second substrate 16. Flexible substrate 24 may conform to the profile of first surface 26A of second substrate 16 such that the cavity defined between the flexible substrate and the second substrate has a substantially uniform thickness (in the X-direction indicated on FIG. 2) and, correspondingly, optically active material 22 in the cavity likewise has a substantially uniform thickness across the entire surface of privacy glazing structure 12 (across the Z-Y plane indicated on FIG. 1). The distance between first surface 26A of second substrate 16 and first surface 28A of flexible substrate 24 (which defines the thickness of optically active material 22) may vary depending on the type of material selected to be used as the optically active material. In some examples, such as examples in which optically active material 22 includes liquid crystals, the distance may range from 5 micrometers to 35 micrometers. In other examples, such as examples in which the optically active material is an electrochromic material, the distance may range from 80 microns to 120 microns.

The distance between first surface 26A of second substrate 16 and first surface 28A of flexible substrate 24 (and correspondingly the thickness of optically active material 22) may vary by less than 10 percent across the entirety of privacy glazing structure 12, such as less than 5 percent, or less than 3 percent. For example, depending on the configuration of the glazing assembly, the distance between first surface 26A of second substrate 16 and first surface 28A of flexible substrate 24 may vary by less than 5 microns across the entirety of privacy glazing structure 12, such as less than 3 microns.

Figure 3:
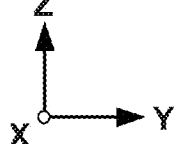
FIG. 3 is a sectional illustration of the example privacy glazing structure of FIG. 1 taken along the B-B sectional line illustrated on FIG. 1.

To attach flexible substrate 24 to second substrate 16, the flexible substrate may be bonded about its perimeter to the second substrate. FIG. 3 is a sectional illustration of privacy glazing structure 12 taken along the B-B sectional line illustrated on FIG. 1 showing an example bonding arrangement of flexible substrate 24 to second substrate 16. As shown in this example, flexible substrate 24 is bonded about its perimeter inside of the between-pane space to the first surface of second substrate 16. Flexible substrate 24 of may be bonded about its entire perimeter, or boundary defining the extent of the flexible substrate, to second substrate 16 to form an enclosed cavity containing the optically active material.

The specific technique and materials used to bond flexible substrate 24 to second substrate 16 may vary depending on the type of material used to fabricate the flexible substrate. In some examples, flexible substrate 24 is bonded via ultrasonic welding or melt bonding to the second substrate. In other examples, an adhesive is used to bond flexible substrate 24 to second substrate 16. When an adhesive is used, the adhesive may be an acrylate, a methacrylate, a urethane, an epoxy, or yet other suitable type of adhesive.

To prevent detachment of the flexible substrate to the rigid substrate to which it is bonded, the adhesive may have sufficient shear strength to hold the flexible substrate to the rigid substrate over the service life of the privacy glazing structure. In some examples, the adhesive exhibits a shear strength of at least 50 Newtons/mm$^2$, such as at least 60 N/mm$^2$, or at least 75 N/mm$^2$. For example, the adhesive may exhibit a shear strength ranging from 50 N/mm$^2$ to 100 N/mm$^2$.

In the example of FIG. 3, flexible substrate 24 is bonded to second substrate 16 with an adhesive 40. The adhesive has a width 42 over which it is in contact with both the flexible substrate and the second substrate. In some examples, the width 42 of adhesive 40 may be greater than 0.5 mm, such as greater than 1 mm, or greater than 2 mm. For example, the width 42 of adhesive 40 may range from 1 mm to 10 mm. Although the width 42 of adhesive 40 is illustrated as being constant about the perimeter of flexible substrate 24, in other configurations, the width of the adhesive may vary about the perimeter of the flexible substrate.

In the illustrated configuration, flexible substrate 24 is shown as being inwardly offset (within the interior of the between-pane space) from spacer 18. When so configured, flexible substrate 24 is not positioned between spacer 18 and the portion of second substrate 16 to which the spacer is bonded. This can be useful to provide a better seal between the spacer and the second substrate than if the flexible substrate is interposed between the spacer and the substrate. That being said, in other examples, flexible substrate 24 may extend below the top edge of spacer 18 such that the flexible substrate is positioned between at least a portion of the spacer and second substrate 16.

Figure 4:
FIG. 4 is a side view illustration of the example privacy glazing structure of FIG. 1 showing an example arrangement of components.
Figure 4:
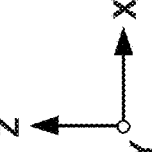

FIG. 4 is a side view illustration of privacy glazing 12 showing an example arrangement of flexible substrate 24 relative to spacer 18. In the illustrated example, spacer 18 is illustrated as a tubular spacer that is positioned between the first substrate 14 and the second substrate 16. The tubular spacer defines a hollow lumen or tube which, in some examples, is filled with desiccant (not illustrated in FIG. 42). Spacer 18 includes a first side surface 44, a second side surface 46, a top surface 48 connecting first side surface 44 to second side surface 46, and a bottom surface 50 also connecting first side surface 44 to second side surface 46. First side surface 44 of spacer 18 is positioned adjacent the first substrate 14 while second side surface 46 of the spacer is positioned adjacent the second substrate 16. Top surface 48 is exposed to the between-pane space 20. In some examples, top surface 48 of spacer 18 includes openings that allow gas within between-pane space 20 to communicate into the lumen of the spacer. When spacer 18 is filled with desiccating material, gas communication can help remove moisture from within the between-pane space, helping to prevent condensation between the panes.

In addition, spacer 18 in the example of FIG. 4 includes at least one sealant positioned between spacer 18 and opposing substrates. In particular, in the example of FIG. 4, spacer 18 is illustrated as including a primary sealant 52 and a secondary sealant 54. Primary sealant 52 is positioned between a portion of the first side surface 44 extending substantially parallel to the first substrate 14 and a portion of second side surface 46 extending substantially parallel to the second substrate 16. Secondary sealant 54 is positioned between a portion of first side surface 44 diverging away from the first substrate 14 and a portion of second side surface 46 diverging away from the second substrate 16.

Spacer 18 can be fabricated from aluminum, stainless steel, a thermoplastic, or any other suitable material. Advantageous glazing spacers are available commercially from Allmetal, Inc. of Itasca, IL, U.S.A. Example materials that may be used as primary sealant 52 include, but are not limited to, extrudable thermoplastic materials, butyl rubber sealants (e.g., polyisobutylene-based thermoplastics), polysulfide sealants, and polyurethane sealants. In some examples, primary sealant 52 is formed from a butyl rubber sealant that includes silicone functional groups or a polyurethane sealant that includes silicone functional groups. Example materials that may be used as secondary sealant 54 include acrylate polymers, silicone-based polymers, extrudable thermoplastic materials, butyl rubber sealants (e.g., polyisobutylene-based thermoplastics), polysulfide sealants, polyurethane sealants, and silicone-based sealants. For example, secondary sealant 54 may be formed from a butyl rubber sealant that includes silicone functional groups or a polyurethane sealant that includes silicone functional groups.

In the illustrated example, the terminal edge of flexible substrate 24 is offset from the top surface 48 of spacer 18 a distance 56. In general, the distance 56 may be minimized to avoid creating a sight line or visual discontinuity between the spacer and the flexible substrate (as well as the terminal edge of the underlying optically active material 22 and the spacer). In some examples, the distance 56 is less than 5 millimeters, such as less than 2 millimeters. For example, distance 56 may range from 0.1 millimeters to 5 millimeters.

With further reference to FIG. 1, privacy glazing structure 12 includes between-pane space 20. To minimize thermal exchange across structure 12, between-pane space 20 can be filled with an insulative gas or even evacuated of gas. For example, between-pane space 20 may be filled with an insulative gas such as argon, krypton, or xenon. In such applications, the insulative gas may be mixed with dry air to provide a desired ratio of air to insulative gas, such as 10 percent air and 90 percent insulative gas. In other examples, between-pane space 20 may be evacuated so that the between-pane space is at vacuum pressure relative to the pressure of an environment surrounding privacy glazing structure 12. In yet other examples, between-pane space 20 is not filled with an insulative gas or evacuated of gas but may instead be filled with air (e.g., dry air).

Spacer 18 holds first substrate 14 generally parallel to and spaced apart from second substrate 16 to define between-pane space 20. Spacer 18 can extend around the entire perimeter of privacy glazing structure 12 to hermetically seal the between-pane space 20 from gas exchange with a surrounding environment. In some examples, the distance between first substrate 14 and second substrate 16 maintained by spacer 18 is greater than approximately 6 millimeters (mm) such as, e.g., from 6.5 mm to 21 mm, or from approximately 8 mm to approximately 10 mm.

Depending on application, first substrate 14, second substrate 16, and/or flexible substrate 24 may be coated with one or more functional coatings to modify the performance of privacy glazing structure 12. Example functional coatings include, but are not limited to, low-emissivity coatings, solar control coatings, and photocatalytic coatings. In general, a low-emissivity coating is a coating that is designed to allow near infrared and visible light to pass through a pane while substantially preventing medium infrared and far infrared radiation from passing through the panes. A low-emissivity coating may include one or more layers of infrared-reflection film interposed between two or more layers of transparent dielectric film. The infrared-reflection film may include a conductive metal like silver, gold, or copper. Advantageous low-emissivity coatings include the LoE-180™, LoE-272™, and LoE-366™ coatings available commercially from Cardinal CG Company of Spring Green, Wisconsin, U.S.A. A photocatalytic coating, by contrast, may be a coating that includes a photocatalyst, such as titanium dioxide. In use, the photocatalyst may exhibit photoactivity that can help self-clean, or provide less maintenance for, the panes. Advantageous photocatalytic coatings include the NEAT® coatings available from Cardinal CG Company.

In general, the surfaces of privacy glazing structure 12 are numbered sequentially starting with a surface of the glass that is facing an external (e.g., outside environment). When privacy glazing structure 12 in the example of FIG. 1 is positioned so that the first substrate 14 faces an exterior environment and the second substrate 16 faces an interior environment, the surface of the first substrate facing the exterior environment may be designated the #1 surface while the opposite surface of the substrate facing between-pane space 20 may be designated the #2 surface. Continuing with this example, the second surface 28B of flexible substrate 24 may be designated the #3 surface while the opposite first surface 28A of the flexible substrate may be designated the #4 surface. Further, the first surface 26A of the second substrate 16 may be designated the #5 surface while the opposite second surface 26B of the second substrate is the #6 surface.

When a low emissivity coating is used, the low emissivity coating may be positioned on any surface of any substrate of privacy glazing structure 12, including on multiple surfaces of the same or different substrates of the unit. In instances when privacy glazing structure 12 includes a single low emissivity coating, for example, the coating may be positioned on the #2 and/or #3 surfaces of unit. When a photocatalytic coating is used, the photocatalytic coating is typically positioned on the #1 surface of privacy glazing structure 12. Another example coating that may be used on privacy glazing structure 12 is an anti-reflective coating. When used, the anti-reflective coating may be positioned on the #1 surface of privacy glazing structure 12 and/or the #2 and/or #5 surfaces of the unit.

The substrates of privacy glazing structure 12 can be coated with additional or different coatings depending on the application. For example, when optically active material 22 is selected to be an electrically controllable optically active material, privacy glazing structure 12 may include electrodes positioned on opposite sides of the material to control the optical state of the material. The electrodes can be physically separate from flexible substrate 24 and second substrate 16 or, instead, can be formed by depositing an electrically conductive coating on one or both of the substrates. In one example, second substrate 16 and flexible substrate 24 are each coated with a transparent conductive oxide ("TCO") coating, such as aluminum-doped zinc oxide and/or tin-doped indium oxide. The first surface 26A of second substrate 16 and the first surface 28A of flexible substrate 24 (or, in other examples, second surface 28B of flexible substrate 24) can each be coated with a substantially transparent conductive layer to control optically active material 22. The transparent conductive oxide coatings can be electrically connected to a power source through electrical conductors extending through spacer 18. In some examples, the transparent conductive coating forms wall surfaces of the cavity between second substrate 16 and flexible substrate 24 which optically active material 22 contacts. In other examples, one or more other coatings may overlay the transparent conductive coating, such as a dielectric over coat.

When second substrate 16 and/or flexible substrate 24 carry a coating facing optically active material 22 (on first surface 26A and/or first surface 28A, respectively), the coating may be absent over the region of the substrates where adhesive 40 is positioned (FIGS. 3 and 4). The coating may be selectively deposited to so as to not be present in the region where adhesive 40 is to be positioned or may be removed after deposition in the region where adhesive 40 is to be positioned. Alternatively, the conductive coating on second substrate 16 may be scribed around the interior perimeter of adhesive 40 to electrically isolate the adhesive. In either case, in some examples, first surface 26A of second substrate 16 and/or first surface 28A of flexible substrate 24 where adhesive 40 is positioned is devoid of any surface coatings on the remainder of the substrate(s). As a result, adhesive 40 may be in direct contact with first surface 26A of second substrate 16 and/or first surface 28A of flexible substrate 24 instead of an intervening coating layer. This may help form a stronger bond between second substrate 16 and flexible substrate 24 than if the flexible substrate is bonded to second substrate 16 through an adhesive bonded to one or more intermediate coating layers.

While privacy glazing structure 12 in the example of FIG. 1 is illustrated as being formed of two comparatively rigid panes—first substrate 14 and second substrate 16—held together via spacer 18, it should be appreciated that a privacy glazing structure in accordance with the disclosure can have other configurations and the disclosure is not limited in this respect. As one example, privacy glazing structure 12 may include a third rigid substrate attached via a second spacer to first substrate 14 or second substrate 16 to form a triple-pane assembly having two between-pane spaces. As another example, privacy glazing structure 12 may not include first substrate 14 attached to second substrate 16 via spacer 18 but may instead be a single cell where flexible substrate 24 forms one exterior surface of the cell and substrate 16 forms an opposite exterior surface of the cell. As yet a further example, second substrate 16 may not be a single substrate but may instead be implemented as laminated substrate having two rigid substrates laminated together which, in combination, form second substrate 16.

Independent of the specific number or configuration of substrates in glazing structure 12, a controlled optical transmission structure that utilizes flexible substrate 24 in lieu of a rigid substrate may weigh less than a comparable structure utilizing the rigid substrate. This can be useful, in some examples, to allow the controllable optical transmission structure to be installed using standard/existing installation hardware used for non-controllable optical transmission structures. Depending on the specific types and thicknesses of materials used, the controllable optical transmission unit formed by bonding flexible substrate 24 to second substrate 16, with optically active material 22 positioned therebetween, may weigh less than 10 kilograms per square meter, such as less than 8 kilograms per square meter. For example, unit may weigh from 5 kilograms per square meter to 10 kilograms per square meter, such as from 6.5 kilograms per square meter to 8.5 kilograms per square meter. As one example, when flexible substrate 24 is formed from 25 micron PET and second substrate 16 is 3.1 mm tempered glass coated with a transparent conductive oxide coating, the unit may weigh approximately 7.5 kilograms per square meter. By contrast, if the unit were made by sandwiching optically active material 22 between to laminated glass substrates for safety, the unit may weigh more than 20 kilograms per square meter.

Various examples have been described. These and other examples are within the scope of the following claims.

The invention claimed is:

1. A privacy glazing structure comprising:
a first rigid substrate formed of glass;
a second rigid substrate formed of a float glass comprising boron that is generally parallel to the first rigid substrate, the second rigid substrate having a first surface and a second surface opposite the first surface;
a spacer positioned between the first rigid substrate and the second rigid substrate to define a between-pane space;
a flexible substrate having a first surface and a second surface opposite the first surface;
a first substantially transparent conductive layer carried on the first surface of the flexible substrate;
a second substantially transparent conductive layer carried on the first surface of the second rigid substrate facing the between-pane space, wherein the second rigid substrate exhibits non-planarity waviness having peaks projecting toward the between-pane space and valleys recessed away from the between-pane space; and
an electrically controllable optically active material disposed within a cavity formed between the first surface of the flexible substrate and the first surface of the second rigid substrate,
wherein the flexible substrate is sufficiently flexible to conform to the non-planarity waviness of the second rigid substrate formed of the float glass comprising boron.

2. The structure of claim 1, wherein the flexible substrate is a polymeric sheet.

3. The structure of claim 2, wherein the polymeric sheet comprises one or more layers formed of polyethylene terephthalate.

4. The structure of claim 1, wherein the flexible substrate is aluminosilicate glass or borosilicate glass.

5. The structure of claim 1, wherein the flexible substrate exhibits a flexural rigidity less than 5 N-mm.

6. The structure of claim 1, wherein the flexible substrate exhibits a T380 less than 2 percent.

7. The structure of claim 1, wherein the flexible substrate has a thickness ranging from 0.0125 millimeters to 0.25 millimeters.

8. The structure of claim 1, wherein the second rigid substrate has a thickness ranging from 2 mm to 4 mm.

9. The structure of claim 1, wherein the flexible substrate has a coefficient of thermal expansion, the second rigid substrate has a coefficient of thermal expansion, and the coefficient of thermal expansion of the flexible substrate ranges from 20 percent of the coefficient of thermal expansion of the second rigid substrate to 120 percent of the coefficient of thermal expansion of the second rigid substrate.

10. The structure of claim 1, wherein the first substantially transparent conductive layer and the second substantially transparent conductive layer form opposite wall surfaces of the cavity.

11. The structure of claim 1, further comprising a third rigid substrate laminated to the second surface of the second rigid substrate.

12. The structure of claim 1, wherein the electrically controllable optically active material is a liquid crystal material having a light transmittance that varies in response to application of an electrical field.

13. The structure of claim 1, wherein the electrically controllable optically active material is selected from the group consisting of an electrochromic material and a suspended particle material.

14. The structure of claim 1, wherein the second rigid substrate is borosilicate glass.

15. A privacy glazing structure comprising:

a first rigid substrate formed of float glass;

a second rigid substrate formed of float glass comprising boron that is generally parallel to the first rigid substrate, the second rigid substrate having a first surface and a second surface opposite the first surface;

a spacer positioned between the first rigid substrate and the second rigid substrate to define a between-pane space;

a flexible substrate having a first surface and a second surface opposite the first surface;

a first substantially transparent conductive layer carried on the first surface of the flexible substrate;

a second substantially transparent conductive layer carried on the first surface of the second rigid substrate facing the between-pane space, wherein the second rigid substrate exhibits non-planarity waviness having peaks projecting toward the between-pane space and valleys recessed away from the between-pane space; and a liquid crystal material disposed within a cavity formed between the first surface of the flexible substrate and the first surface of the second rigid substrate, wherein the flexible substrate is sufficiently flexible to conform to the non-planarity waviness of the second rigid substrate formed of the float glass comprising boron.

16. The structure of claim 15, wherein the first rigid substrate comprises sodium-lime-silicate glass.

17. The structure of claim 15, wherein the flexible substrate is a polymeric sheet.

18. The structure of claim 17, wherein the polymeric sheet comprises one or more layers formed of polyethylene terephthalate.

19. The structure of claim 15, wherein the flexible substrate is aluminosilicate glass or borosilicate glass.

* * * * *